United States Patent Office 3,491,160
Patented Jan. 20, 1970

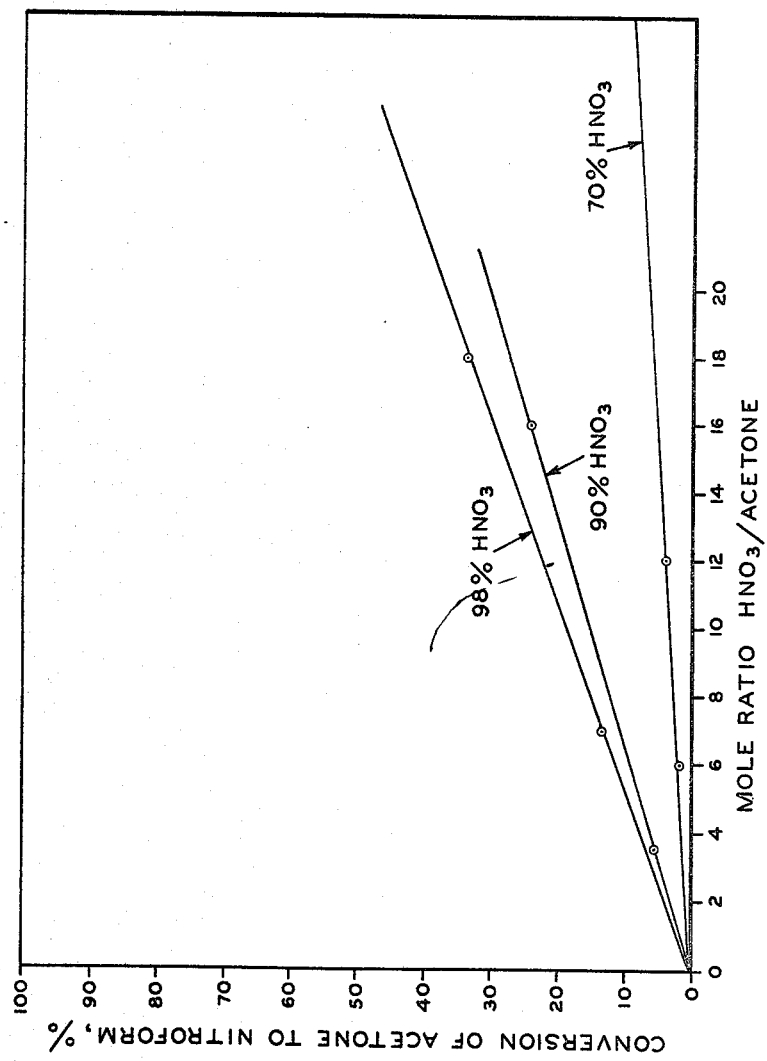

3,491,160
PROCESS FOR PRODUCING NITROFORM
Dean E. Welch, Charles City, Iowa, and Richard W. Hein, Ridgefield, Conn., assignors to Escambia Chemical Corporation, Pace, Fla., a corporation of Delaware
Filed Feb. 5, 1968, Ser. No. 702,892
Int. Cl. C07c 79/02; C07b 11/00
U.S. Cl. 260—644         11 Claims

ABSTRACT OF THE DISCLOSURE

A process for the production of nitroform by reacting acetone with an excess of a source of nitronium ion, the preferable source being nitric acid. The optimum temperature range is from about 30° C. to 150° C., with a preferred range of from about 60° C. to 100° C. The optimum concentration of nitric acid is about 70% or greater, preferably about 90% or greater, by weight, of the reaction mixture. The preferred molar ratio is at least 3 moles of nitric acid to 1 mole of acetone.

---

The present invention relates to a novel process for producing nitroform, i.e. trinitromethane. More specifically, the invention is concerned with the treatment of acetone with an excess of a source of nitronium ion [$NO_2^+$], preferably nitric acid, to provide high yields of nitroform without the difficulties that have hampered prior art methods.

Various methods for the preparation of nitroform have been known heretofore as described, for example, in U.S. Patent No. 3,125,606 issued to Glover et al. Glover et al. teach that the process of acetylene nitration followed by isolation of the small amounts of nitroform so produced has not been effectively utilized due to the extreme conditions and complex equipment required in the process. See column 1, lines 68–70.

Glover et al. further teach, in column 2, some disadvantages of a number of nitroform syntheses employing the reduction of tetranitromethane. The main disadvantage of these processes is that the tetranitromethane starting material can be produced only in small yields, making its use uneconomical. This is pointed out in U.S. Patent No. 3,067,261, to Clark et al. at column 1, lines 31 to 50. The process taught by Glover et al. to solve the prior art problems also employs tetranitromethane as starting material and is subject to the defect of being uneconomical.

The Clark et al. Patent No. 3,067,261 is also uneconomical since it requires an amide of malonic acid for the starting material, which is not inexpensive, and produces mixtures of polynitroderivatives of methane which must be separated.

It is an object of the present invention to overcome the disadvantages of the prior art methods for producing nitroform.

It is also an object of the present invention to provide a novel one-step process for the production of nitroform under mild process conditions by nitrating acetone, a readily-available, economical, starting material.

It is a further object of the present invention to provide a novel process for the production of nitroform by reacting acetone with an excess of nitric acid, or other source of nitronium ion.

Other objects of the invention will be apparent to those skilled in the art from reading the present disclosure, taken in conjunction with the appended drawing, in which FIG. 1 is a graph illustrating the relationship between the molar ratio of the reactants, nitric acid to acetone, and the percent conversion of acetone to nitroform, with the parameter dependent on the concentration of nitric acid.

It is well known that nitroform is of great commercial importance due to its usefulness in a wide variety of applications. One application of nitroform is as an intermediate in the preparation of numerous compounds for the production of high explosives and propellants.

In accordance with the present invention, it has now been discovered that nitroform may readily be obtained by reacting acetone with a source of nitronium ion to produce high percent conversions of acetone to nitroform. The conversion of acetone to nitroform appears to be highly selective, with little or no tetranitromethane, which plagued some of the prior art processes, being formed.

Although the present invention will be described in terms of using acetone per se as the starting material, it is to be understood that the process may employ any source of acetone as the starting material. For example, nitro-t-butyl alcohol may be oxidized to yield nitroform presumably because it is in equilibrium with acetone and nitromethane. Other substances which can be hydrolyzed or oxidized to acetone are also suitable feedstock. Among these substances which may be employed are preferably alpha-hydroxy-isobutyric acid, diacetone alcohol, and isophorone. Additionally, other alpha-methyl ketones than acetone will yield nitroform in accordance with the process of the present invention, when used in place of acetone. Thus methyl ethyl ketone, methyl isopropyl ketone, methyl-n-butyl ketone, etc., may be employed.

While the present invention will be described in terms of nitric acid ($HNO_3$) as the source of nitronium ion, it will be understood that other sources may be used. Among the preferred sources of nitronium ion are nitric acid, dinitrogen pentoxide and nitryl chloride.

In accordance with a preferred embodiment of the invention, acetone is reacted with an excess of nitric acid, containing limited quantities of water, at slightly elevated temperatures. As shown in the drawing, the conversion of acetone to nitroform is directly proportional to the molar ratio of nitric acid to acetone, with the constant of proportionality being a function of the concentration of the nitric acid. The percentage conversion of acetone to nitroform, is defined to include only the acetone converted into nitroform; based on actual measurement of the amount of nitroform produced. For purposes of calculation, it is assumed that all of the acetone is converted into nitroform or other products. Thus, the present conversions expressed present the effectiveness of the present process in its least favorable light.

The conversion to nitroform is largely dependent on the concentration of the nitric acid ($HNO_3$). There is no theoretical lower limit on the concentration of acid to obtain a conversion to acetone. However, a preferred concentration of nitric acid is at least 70% by weight nitric acid ($HNO_3$) to almost total nitric acid with a small amount of water present. Below a concentration of 70% nitric acid, conversion to nitroform is quite low. The optimum range for high conversion of acetone to nitroform is 90% by weight nitric acid or above. Since the higher the concentration of nitric acid, the greater is the conversion for each mole of nitric acid, the major upper limit on the concentration of the nitric acid is the cost. In addition, there must be at least a small amount of water present for the hydrolysis to obtain the nitroform according to the mechanism hypothesized infra in this application. Conversion to nitroform may be as high as 60% of theoretical depending on reaction conditions and concentration of the nitric acid.

The molar ratio of nitric acid to acetone controls the percentage conversion to nitroform for a given nitric acid concentration. Although low ratios may be used, the economics of the process indicate the use of a great excess of nitric acid. The ratio of nitric acid to acetone should be at least 3 to 1. A preferred ratio should be at least 6 to 1. The upper limit for practical purposes is about 40 to 1.

Since conversion is dependent on both the concentration of the nitric acid and the molar ratio of nitric acid to acetone, plotting of the relationship as shown in the figure of the drawing serves the function of enabling one skilled in the art to choose the most economical combination. A preferred combination would be at least 90% concentration of nitric acid and a molar ratio of at least 6 moles of nitric acid to one mole of acetone.

Optimally, the process is conducted at a temperature range of 30° C. to 150° C. It should be understood, however, that higher and lower temperatures may be employed. However, at temperatures above 150° C., nitroform may partially decompose, and the reaction is slow below 30° C. Hence, one preferred temperature range is between 60° C. and 100° C. At these temperatures, the reaction is complete in about three hours. The amount of time for completion of the reaction is normally between 30 minutes and 5 hours. The reaction can be completed in a shorter time at higher temperatures or it can take a longer time to complete at lower temperatures.

Although it is not intended to be bound by any reaction mechanism or theoretical concept of the process of present invention, the reaction involved is believed to be illustrated by the following series of reactions in skeletal form:

$$HNO_3 \rightarrow NO_2^+ \quad (1)$$

The nitric acid ionizes to give a source of nitronium ion [$NO_2^+$], which is the active agent in nitration, as shown in reaction 1 above. The presence of other acids, such as acetic acid or sulfuric acid, or of nitrogen dioxide is not necessary for the production of nitronium ion. No catalyst is necessary.

$$3[NO_2]^+ + CH_3-\overset{O}{\underset{\|}{C}}-CH_3 \longrightarrow CH_3-\overset{O}{\underset{\|}{C}}-C-(NO_2)_3 \quad (2)$$

The nitronium ion replaces stepwise the hydrogen atoms attached of one of the methyl groups of the acetone to yield trinitro-methyl, methyl ketone as shown in reaction 2 above.

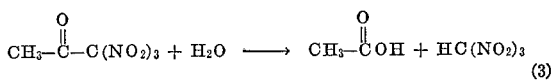
$$CH_3-\overset{O}{\underset{\|}{C}}-C(NO_2)_3 + H_2O \longrightarrow CH_3-\overset{O}{\underset{\|}{C}}OH + HC(NO_2)_3 \quad (3)$$

The trinitro-methyl, methyl ketone is hydrolyzed by the presence of even small amounts of water to produce nitroform and acetic acid, as shown by reaction 3 above.

In order more clearly to disclose the nature of the present invention, specific examples of the practice of the invention are hereinafter given. It should be understood, however, that this is done by way of example and is intended to limit neither the scope of the invention nor the ambit of the appended claims. Parts are expressed in terms of parts by weight unless otherwise stated.

EXAMPLE 1

A mixture of 26.1 grams of 97% strength nitric acid (406 millimoles), 38.8 grams of acetic acid (646 millimoles) and 2.45 grams of nitrogen dioxide (53 millimoles) was mixed with 0.59 grams of reagent grade acetone (10.2 millimoles) in a reaction flask. A temperature of 30 to 80° C. was maintained for a period of time of 5 hours. Assuming all acetone is converted and only one mole of nitroform can be produced per mole of acetone, the conversion to nitrofrm was 59%, based upn actual measurement of the amount of nitroform produced.

EXAMPLE 2

About 9.99 grams of 98% strength nitric acid (155 millimoles) was mixed with 0.50 grams of reagent grade acetone (8.6 millimoles) in a reaction flask. A temperature of 65° C. was maintained for a period of time of 2 hours. The conversion of acetone to nitroform was 34%, under the assumptions of Example 1. The concentration of nitroform in the final reaction mixture was 5.7% by weight.

EXAMPLE 3

About 10.8 grams of 90% strength nitric acid (154 millimoles) was mixed with 0.56 grams of reagent grade acetone (9.7 millimoles) in a reaction flask. A temperature of 65° C. to 75° C. was maintained for a period of time of 40 minutes. The conversion of acetone to nitroform was 24%, under the assumptions of Example 1. The concentration of nitroform in the final mixture was 4.3% by weight.

EXAMPLE 4

9.66 g. of 98% nitric acid (150 millimoles) was warmed to about 60° C. and 0.73 g. methyl ethyl ketone (10.1 millimoles) was added over a period of 15 minutes while maintaining the temperature of the reaction mixture at about 60–70° C. The mixture was then held at 45–60° C. for 20 minutes. A 13% conversion of the methyl ethyl ketone to nitroform was obtained.

In each of the foregoing examples the nitroform may be recovered from the final reaction mixture, by adding sufficient water to reduce the nitric acid concentration below that in an azeotropic mixture of nitric acid and water, distilling the mixture at a pressure of about 200 mm. of mercury, and recovering the mixture of nitroform and water which passes over as distillate. The upper layer of the distillate, which is substantially nitroform is separated and recovered.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. A process for producing nitroform which comprises reacting an alpha methyl ketone with an excess of a source of nitronium ion selected from the class consisting of nitric acid, dinitrogen pentoxide and nitryl chloride at temperatures of about 30° C. to 150° C.

2. A process according to claim 1, wherein the alpha methyl ketone is acetone.

3. A process according to claim 1, wherein the alpha methyl ketone is methyl ethyl ketone.

4. A process according to claim 1, wherein the temperature range is about 60° C. to 100° C.

5. A process for producing nitroform which comprises reacting acetone with an excess of nitric acid at a temperature of about 30° C. to 150° C.

6. The process of claim 5 wherein the temperature range is about 60° C. to 100° C.

7. The process of claim 5 wherein the nitric acid is of at least about 70% strength.

8. The process of claim 5 wherein the nitric acid is of at least about 90% strength.

9. The process of claim 5 wherein the molar ratio of nitric acid to acetone is at least about 3 to 1.

10. The process of claim 5 wherein the molar ratio of nitric acid to acetone is at least about 6 to 1.

11. A process for producing nitroform comprising reacting acetone with at least 90% nitric acid in a molar ratio of at least about 3 moles of nitric acid to 1 mole of acetone at a temperature of about 30° C. to 150° C.

References Cited

UNITED STATES PATENTS 2,343,256  3/1944  Hass et al. _____ 260—644

OTHER REFERENCES

Hass et al. (2), J. Am. Chem. Soc., vol. 76, pp. 2692 to 2694 (1954).

LELAND A. SEBASTIAN, Primary Examiner

U.S. Cl. X.R.

260—688